United States Patent [19]

Wilson

[11]B 3,995,123
[45] Nov. 30, 1976

[54] TELEPHONE CALCULATOR

[76] Inventor: Charles H. Wilson, 3317 Glenhurst Ave., Minneapolis, Minn. 55416

[22] Filed: Jan. 9, 1974

[21] Appl. No.: 432,049

[44] Published under the second Trial Voluntary Protest Program on March 23, 1976 as document No. B 432,049.

[52] U.S. Cl............................ 179/90 K; 179/2 DP; 235/156
[51] Int. Cl.²......................................... H04M 1/50
[58] Field of Search............ 179/2 DP, 90 K, 90 AN; 235/156

[56] References Cited
UNITED STATES PATENTS

| | | | |
|---|---|---|---|
| 3,725,907 | 4/1973 | Boulanger | 340/365 A |
| 3,760,121 | 9/1973 | Nissim | 179/90 K |
| 3,829,783 | 8/1974 | Groenendaal et al. | 328/14 |

*Primary Examiner*—Kathleen H. Claffy
*Assistant Examiner*—C. T. Bartz
*Attorney, Agent, or Firm*—Merchant, Gould, Smith, Edell, Welter & Schmidt

[57] ABSTRACT

Apparatus and method for providing a standard telephone with localized calculating and read-out capabilities. Miniaturized electronic calculator circuits are integrally mounted within a standard telephone chassis and operatively share use of the telephone keyboard selector buttons with the existing telephone circuits. Input stimuli applied to the push-button selector keys are simultaneously converted into touch-tone dialing information for the telephone circuits and into digital information for the calculator circuits. A plurality of calculator function input keys supplement the shared standard telephone keyboard and provide function information input capability to the calculator circuits. Easily operated switches enable either independent or simultaneous use of the telephone and/or the calculator circuits. A numerical display panel mounted on the face of the telephone chassis provides visual read-out capability for the calculator and for entered telephone numbers.

6 Claims, 4 Drawing Figures

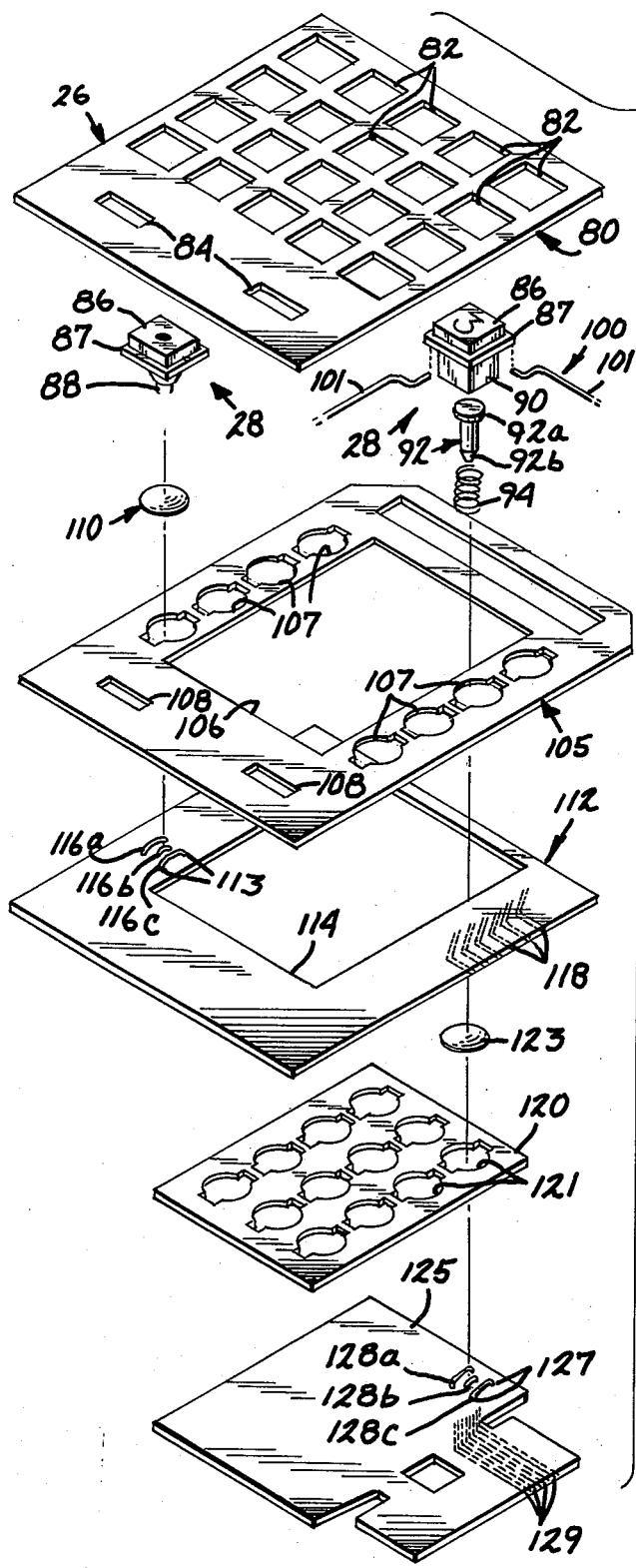
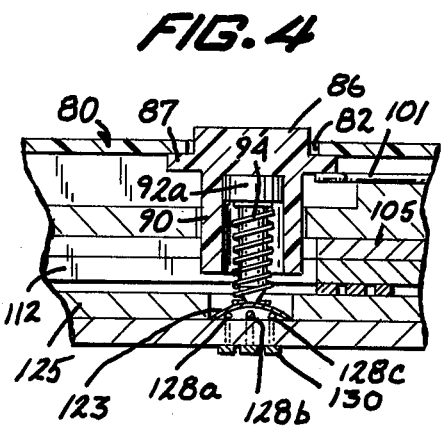

TELEPHONE CALCULATOR

BACKGROUND OF THE INVENTION

1. Field of the Invention

This invention relates generally to telephones and calculators and more specifically to an apparatus combining a miniaturized calculator with a telephone, both housed within the standard telephone chassis and operatively sharing a common input data keyboard.

2. Description of the Prior Art

The telephone has for some time been established as an indispensible item in our society, to an extent that at least one telephone is typically found within each family's home and upon each businessman's desk. Further, in the rapid pace of today's business world, the general purpose calculator has become a necessary and indispensible tool to the businessman who must have immediate access to the calculator throughout his working day. It is not uncommon, therefore, to find both a telephone and a general purpose calculator upon the businessman's desk, whether he is a broker, market analyst, insurance agent, banker, accountant, engineer, economist, retailer, or what have you. Not only must he have immediate access to the calculator in forming his daily decisions, but he oftentimes requires use of his calculator while simultaneously conversing with another on a telephone. All too often in the maze of paperwork cluttering his desk or through inadvertent misplacement, the businessman is at a loss to find his calculator when he most needs it, and especially when he is conversing on the telephone.

Although various styles of streamlined chassis have appeared as of late, the classic standard desk-type telephone chassis is still generally found in the home and is predominately employed by the business world. In contrast, however, miniaturized inexpensive portable electronic general purpose calculators, made possible by state-of-the-art technological innovations in microelectronics miniaturization, have generally replaced the bulky mechanical and electric general purpose calculators for daily calculations, both at home and in the business world. Use of the small (hand-held) electronic calculators makes it even easier for the businessman to misplace his calculator in the active pursuit of his daily activities.

Computation system aids for the businessman, which used the dial or push-button input capabilities of a standard telephone for providing input data to a centralized calculator or computer have appeared in the prior art. These systems typically employ the sound producing properties of the input apparatus of a telephone for translating data entered upon the telephone dial or keyboard into electrical signals for transmission thereof to a remotely located computer. The telephone itself, therefore, is employed as a remote data input terminal for the distant computer. Such systems, generally demand the undivided attention of the telephone employed for the remote transmission, and subsequent reception, such that a user cannot simultaneously use the telephone for carrying on a conversation with another. Further, any input data entered into the remote computer by means of the telephone terminal, or any results of manipulative or arithmetic operations performed upon such data by the computer are not readily visible to the user. These systems typically require print-out or read-out apparatus independent of the telephone.

The inverse of the remote telephone terminal also appears in the prior art. This type of system employs a keyboard of a standard adding machine operatively connected with a translator matrix and a tone-code transmitter for converting any input data entered upon the adding machine keyboard into coded tones for transmission over telephone lines or similar channels to a centralized calculator or computer.

The prior art systems, while enabling remote computer access by a person from his desk, are not practically or economically feasible for use in the office of every businessman for carrying on his routine daily calculations. Besides their relatively high cost, these systems typically requires access to a larger computer and some knowledge of its input programming format; such requirements are not generally suited for the average businessman. Further, such systems, by providing access to sophisticated centralized calculating or computer apparatus by a large number of time sharing users, demand extra time of those users. A user must ask for a slice of the computer's time and then wait for the computer to perform his entered program. Further, due to the costs and time involved, it is generally not in the best interests of a user to employ the large centralized computer for his more simple daily routine calculations. Another disadvantage of using a telephone operated remote terminal for the typical businessman, is that his use of such terminal precludes him from simultaneously employing that telephone for its normal purpose of conversing with another.

Applicant's invention overcomes these problems of the prior art for the businessman by providing a miniaturized general purpose calculator directly within the standard telephone chassis normally found on his desk, and readily accessible to him at all times. He is immediately provided with a visual indication of his entered input data and of the results of the calculations or arithmetic manipulations performed, and can simultaneously perform such calculations while conversing in normal fashion on the same telephone.

While the present invention will be described in conjunction with its use in the standard telephone chassis now typically employed throughout the telephone industry, it will be understood that the invention is not limited to this specific shape or form of chassis, but is equally applicable for use with any telephone module. Further, while the present invention as described, uses a specific type of electronic calculator, employing specific function input selections, it will be understood that the invention is not limited to the use of this particular electronic calculator, but that other calculators (both more or less complex, and employing different function selections) may be employed without departing from the spirit or intention of this invention.

SUMMARY OF THE INVENTION

Applicant's invention uniquely combines an electronic general purpose calculator and a standard telephone having a push-button selector keyboard within the chassis of a standard telephone. The calculator forms an integral part of the telephone, and operatively shares the telephone's selector keyboard for receiving it's input data.

Input stimuli entered by means of the shared input selector keyboard may alternatively be employed to enter an encoded telephone number to telephone circuits within the chassis or to enter digital information to the calculator circuits within the chassis. The telephone circuits comprise those circuits normally found within a telephone, for providing normal tlephone functions. The calculator circuits perform designated arithmetic manipulations and calculations upon entered digital information. While operatively sharing a common input selector keyboard, the calculator and telephone circuits are selectively responsively independent to input stimuli entered thereby. However, in appropriate circumstances, input stimuli entered into the shared keyboard can be simultaneously employed as an encoded "telephone number" by the telephone circuits while also being entered as an operand to the calculator circuits. A pair of switching elements allow a user of Applicant's invention to operate the telephone and calculator functions either simultaneously or independtly of one another.

A visual, digital display forming an integral part of the telephone chassis, and readily visible by a user of the shared keyboard, provides an immediate visual display of input data entered upon the keyboard. The user, at his option, may cause the visual display to represent (1) a telephone number, (2) input data entered into the calculator circuits, or (3) selected operands and results of arithmetic or manipulative oerations performed by the calculator.

BRIEF DESCRIPTION OF THE DRAWINGS

Referring to the figures, wherein like numerals represent like parts throughout the several views:

FIG. 3 is an exploded diagrammatic view of the major functional elements of the input selection means of a preferred embodiment of my invention, illustrating the functional cooperation and relative positioning of the keyboard, the tone generating apparatus and the calculator circuit portions of my invention, and FIG. 4 is a detailed cross-sectional view of one of the shared keyboard selector keys disclosed in FIG. 1, and generally taken along the line 4—4 in FIG. 1.

DESCRIPTION OF THE PREFERRED EMBODIMENT

Figure 1:
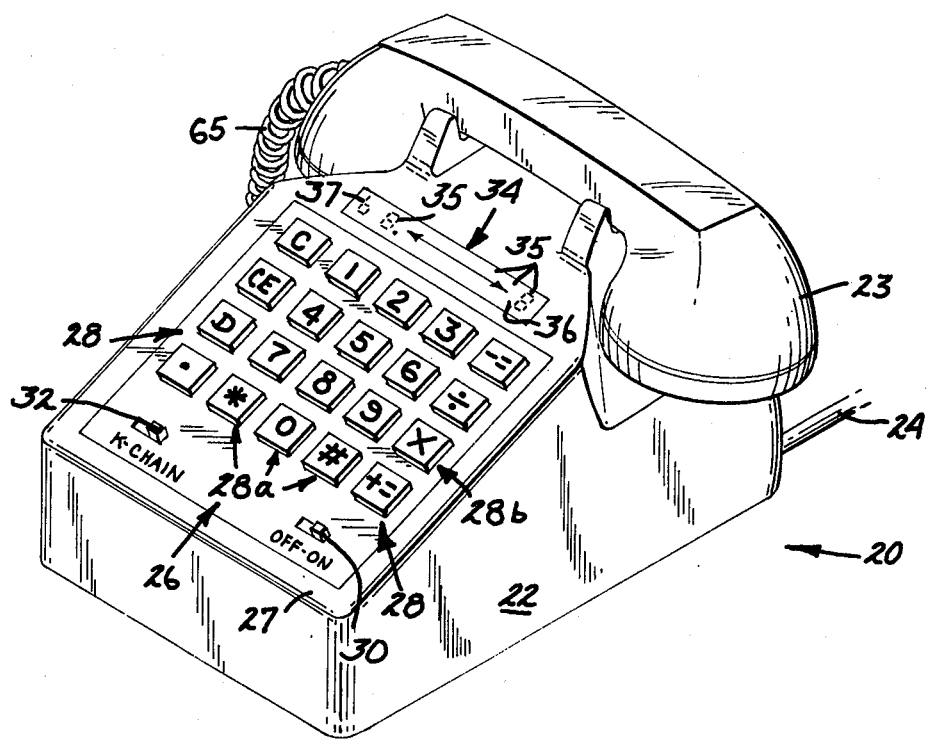
FIG. 1 is a diagrammatic representation of my invention as employed with a standard desk-type telephone having a pushbutton selector keyboard.

Referring to FIG. 1, the concept of this invention is illustrated as it would be applied for use with a telephone generally designated at 20. The telephone illustrated is a standard desk-type telephone having a chassis 22, a hand-set 23 and a telephone cord 24 operatively connecting electrical circuits within the telephone 20 with the general telephone system (not shown).

A keyboard generally designated at 26 forms a integral part of an upwardly oriented main face 27 of the chassis 22. In the preferred embodiment, the keyboard 26 comprises twenty input selector push-button keys (generally designated at 28) aligned in five columns, four keys to a column. The three inner columns including 12 push-button keys (generally designated at 28a) comprise those input keys normally found on the standard keyboard of a "touch-tone" telephone; these keys are consecutively numerically designated by the numerals 0–9 and include 2 special-purpose keys designated as "*" and "No." which provide special servicing functions of the telephone and are generally functionally inoperative to a user of the telephone.

The two outer columns of selector keys (generally designated at 28b) and including 8 push-button selector keys are "function selector" keys which provide operative input instructions to calculator circuits within the telephone, as hereinafter described. Each of the 8 function selector keys 28b is uniquely designated by an alphabetic or character designation representing a specific operative function of the calculator, hereinafter described. In the preferred embodiment, these function keys and the user identifications most commonly associated therewith are as follows: "C" — clear key; "CE" — clear entry key; "D" — display recall key; "." — decimal point; "—=" — minus, equals (total) key; "÷" — division key; "X" — multiplication key; and "+=" — plus, equals (total) key. The specific functions associated with these function keys will be described in more detail later herein.

Referring to FIG. 1, the toggle arms of two slide activated switches are also mounted for external activation upon the upper face 27 of the chassis 22, immediately below the keyboard 26. A first of these switches 30 is entitled "Off-On" and is the power switch for energizing the calculator circuits of the telephone, as hereinafter described. A second switch 32, designated as "K-CHAIN," is generally termed the constant switch and is also operatively connected with the calculator circuits of the telephone, as hereinafter described.

An eight digit digital display 34 forms an integral part of the upwardly directed face 27 of the chassis 22. In the preferred embodiment, the characters of the digital display comprise light emitting diodes (LED's); however, it will be understood that other digital display apparatus could be employed within the spirit and intent of this invention. In the preferred embodiment, the digital display 34 includes eight numerical digital display positions 35, each having associated therewith and positioned to its right when viewed as in FIG. 1, a decimal point 36. A ninth display position 37, located at the left-most position of the digital display 34, indicates an overflow condition of the calculating circuits, (i.e., when the results of a calculation exceed the eight digit display capacity).

Figure 2:
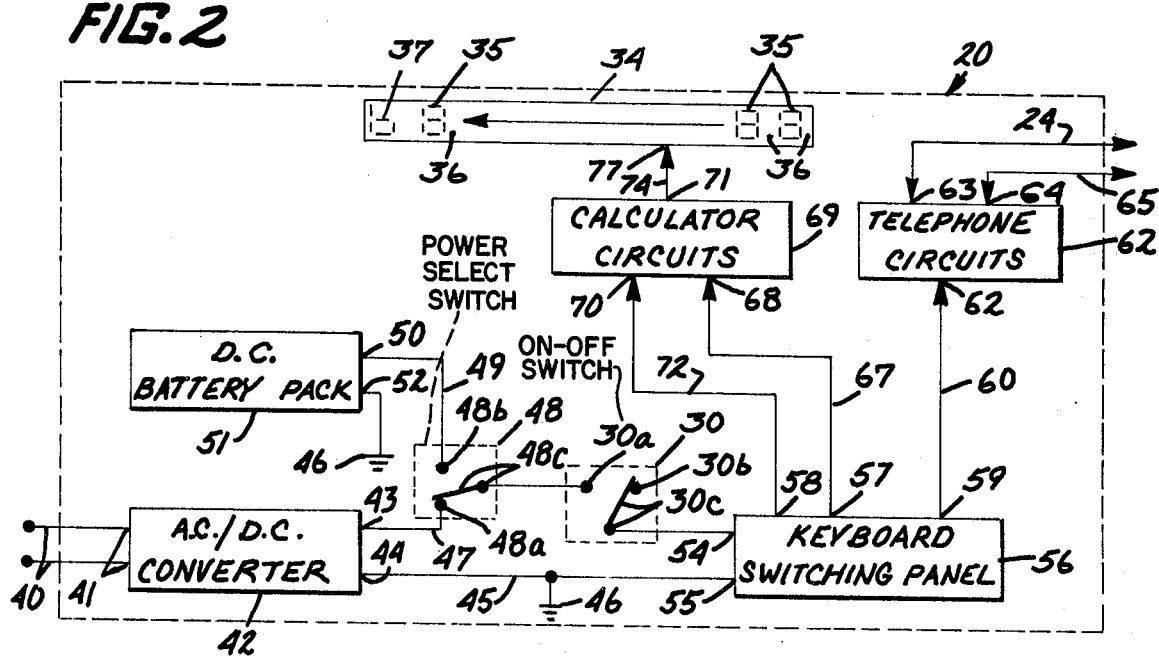
FIG. 2 is a block diagram representation illustrating the functional cooperation of the electrical circuit elements of my invention.

FIG. 2 is a block diagram representation of the electrical functional elements of this invention. Referring to FIG. 2, a pair of input power lines 40 are connected to provide AC power input to a pair of AC input terminals 41 of an AC to DC converter 42. The converter 42 further has a first DC output terminal 43 and a second DC output terminal 44. The second DC output terminal 44 is connected by means of a common bus line 45 to an electrical ground or reference 46.

The first output terminal 43 of the converter 42 is connected by means of a positive bus line 47 to a first stationary contact 48a of a power select switch 48. The switch 48 further has a second stationary contact 48b and a movable contact 48c. The movable contact 48c of the switch 48 is operatively connected with an activating toggle arm of the switch 48, which is mounted for external access (not illustrated) on the back side of the telephone chassis 22.

The second stationary contact 48b of the switch 48 is connected by means of a conductor 49 to a positive output terminal 50 of a DC battery pack 51. The battery pack 51 further has a common output terminal 52 directly connected to the reference 46.

The movable contact 48c of the switch 48 is directly connected to a first stationary contact 30a of the ON-OFF switch 30. The ON-OFF switch 30 further has a second stationary contact 30b and a movable contact 30c. The second stationary contact 30b is a "dead" terminal and is electrically disconnected. The movable contact 30c of the switch 30 selectively engages either the first or second stationary contact 30a and 30b respectively of the switch 30. The movable contact 30c of the switch 30 is synonymous with the toggle arm of like designation of the switch 30 illustrated in FIG. 1, and relative positioning thereof between the ON and OFF positions corresponds to operative engagement of the movable contact 30c with the first 30a and second 30b stationary contacts respectively of the switch.

The movable contact 30c of the switch 30 is directly connected to a power input terminal 54 of a keyboard switching panel generally illustrated at 56. The keyboard switching panel 56 further has a reference input terminal 55 directly connected to the common bus 45, a first calculator signal output terminal 57, a second calculator signal output terminal 58 and a telephone output terminal 59. As will become apparent upon a more detailed description of the keyboard switching panel 56, the output terminal designations 57, 58 and 59 in FIG. 2 each represents a plurality of independent signal terminals, the single numeral designation (57–59) being employed in FIG. 2 for the purpose of generally illustrating signal flow paths from the keyboard switching panel 56. It will be implicitly understood, therefore, that wherever signal flow paths are described herein, those signal flow paths represent a plurality of independent conductors. Similarily, the "terminals" which the signal flow paths connect also each represent a plurality of input or output terminals, as the case may be.

The telephone output terminal 59 of the keyboard switching panel 56 is connected by means of a signal flow path 60 to a signal input terminal 61 of a telephone circuit functional block 62. The telephone circuit block 62 further has a first signal output terminal 63 connected by means of the telephone cord 24 (representing a signal flow path) to the centralized telephone system (no illustrated) to which the telephone is connected, and a second terminal 64 connected by means of a signal flow path 65 to the hand-set 23 of the telephone 20.

The telephone circuit functional block 62 represents all of those electrical and electro-mechanical circuits conventionally found within the chassis 22 of a "touch-tone" telephone for performing normal telephone associated functions. These functions include, but are not limited to: the operative encoding of user input stimuli into "telephone numbers — or tones" for transmission via the telephone cord 24 to the centralized telephone system; the operative reception by means of the cord 24 of encoded signals identifying that specific telephone 20 for operatively connecting that telephone to the centralized system upon receipt of such encoded identifying signals (i.e., causing the telephone to "ring" and to be enabled for conversation upon lifting of the hand-set 23); and the transmission and reception of conversations of a user of the telephone by means of the hand-set 23 operatively connected with the telephone circuits 62 by means of the signal flow path (cord) 65. In general, therefore, the circuits represented by the telephone circuit functional block 62 perform all of those necessary and operative functions normally associated with the standard telephone installed by a telephone company for operative use by a home owner or businessman.

The first calculator output terminal 57 of the keyboard switching panel 56 is connected by means of a signal flow path 67 to a data input terminal 68 of a calculator circuit functional block 69. The calculator circuit block 69 further has a "function" input terminal 70 and a signal output terminal 71. The second calculator signal output terminal 58 of the keyboard switching panel 56 is connected by means of a signal flow path 72 to the "function" input terminal 70 of the calculator circuit block 69.

The calculator circuit functional block may comprise any electronic general purpose calculator circuits which operate in response to received digital input information (in the form of electrical input signals), provide manipulative and arithmetic operations thereon and in response thereto, and provide output signals which are indicative of the received input information and/or the results of the manipulative and/or arithmetic operations performed thereon. One example of miniaturized electronic circuits which have been successfully employed in the preferred embodiment of this invention are the electronic calculator and display drive circuits of the Heathkit Portable Electronic Calculator Model No. (IC-2009) manufactured by the Heath Company of Benton Harbor, Mich. The circuits for this calculator are described in the "Heathkit" Operation Manual" No. I-597-1259, published in 1973 by the Heath Company.

The signal output terminal 71 of the calculator circuit 69 is connected by means of a signal flow path 74 to a signal input 77 of the display unit 34. It will be understood that the input terminal 77 of the display unit 34 comprises a plurality of individual input drive terminals selectively wired (not illustrated) to the individual digital display characters 35, to the decimal points 36 and to the over-range indicator character 37 of the display panel 34. The display panel 34, therefore, is generally operable to provide a digital display indicative of the output signals from the calculator circuits 69, and received at its signal input terminal 77.

An exploded diagrammatic view of the major functional elements of the input selection means of the preferred embodiment, illustrating the functional cooperation with and relative positioning of the elements of the keyboard 26 with respect to the keyboard switching panel 56 (FIG. 2), is illustrated in FIG. 3. For the sake of clarity, only a representative one of functionally identical multiple elements (e.g., the keys) has been illustrated in FIG. 3, it being understood that the omitted elements operate in like manner to the elements illustrated. Referring to FIG. 3, a grid retaining member 80 having a plurality of uniformly sized openings 82 regularly positioned in rows and columns therein, comprises the front plate portion of the keyboard 26 (FIG. 1). The retaining grid 80 also has a pair of elongated openings 84 formed therein along one edge for allowing the toggle arms of the switches 30 and 32 to operatively project therethrough. Each of the plurality of regularly sized openings 82 is aligned to accept one of the plurality of selector keys 28 of the keyboard 26, previously described with respect to FIG. 1.

Two of the selector keys are illustrated in the exploded view of FIG. 3. One of the two illustrated selector keys is positioned to align with one of the outer columns (28b) of the keyboard 26, and the other selector key illustrated is positioned to align with one of the three inner columns (28a) of the keyboard 26. Each of the selector push-button keys 28 comprises an upper portion 86 sized to move freely within one of the openings 82 in the retaining grid 80, and further has a flanged portion 87 sized larger than and positioned below the openings 82 in the grid 80 to prevent removal in the upward direction of the key 28 through the retaining grid 80.

Referring to FIGS. 1 and 3, it will be noted that the lower portions of those keys 28 positioned in the two outer columns (28b) of the retaining grid 80 differ slightly in shape from those keys operatively positioned for alignment within the central three columns (28a) of the retaining grid 80. The lower portions of the eight "function" keys (previously described, and positioned to align with the two outer columns (28b)) comprise a relatively short stud member 88 axially downwardly extending about a central axis of each key.

Referring to FIGS. 3 and 4, the lower portions of those keys 28 positioned for alignment with the three central columns (28a) of openings 82 of the retaining grid 80, comprise a hollow downwardly extending tube-like extension 90 of the flange portion 87 of each key. It will be noted that the upper portion 86, the flange 87 and the extended lower portion 90 of these keys 28 form a single integral unit. A stud 92 having an enlarged head 92a and an elongated stud body 92b is securely anchored within each of those keys 28 positionally aligned within the central three columns 28a. The enlarged head 92a of the stud 92 is sized to form a tight compression fit with the internal cavity of the tube-like extension 90. The tip of each of such anchored studs 92 projects a predetermined distance below the bottom (open) end of the extension 90; that distance, denoted as "x" in FIG. 4, represents the distance of "travel," as hereinafter described, of those keys 28 containing the studs 92.

Referring to FIG. 3, it will be noted that the input selector means generally comprises a layered structure compactly sandwiched together. The upper-most layer comprises the retaining grid 80. Proceeding downwardly from the retaining grid 80, is a "tone" generating layer, generally designated at 100, and comprising in part a mechanically activated toggle arm grid 101 positionally aligned for selective activation by those keys 28 positioned within the central three columns 28a of the retaining grid 80. Individual toggle arms of the grid of switch activating toggle arms 101 are aligned with the keys 28 so as to be operatively engaged by the extended flanged portion 87 of the keys 28 when depressed and are urged thereby in a downward direction (see FIG. 4) over the travel distance (x). In the preferred embodiment, the toggle arms 101 of the tone generating circuits 100 activate electrical switches (not sillustrated) located around the periphery of the keyboard 26, which selectively transmit signals by means of the signal flow path 60 (FIG. 2) to the telephone circuits for generating tone coded dialing information. Although a specific method of activating the tone generating circuitry has been illustrated in the preferred embodiment, it will be understood that other activation techniques could also be employed within the spirit and intent of this invention. What is significant to this invention, however, is that certain ones of the keys 28 of the keyboard 26, when activated, simultaneously provide unique activation input data to both the telephone circuits 62 and to the calculator circuits 69 (as hereinafter described).

A first disc retaining board 105 is positioned immediately below the tone generating apparatus 100. The first disc retaining board 105 is of thin and fairly rigid material having external dimensions generally equal to those of the retaining grid 80. The first disc retaining board 105 has centrally located opening 106 sized and aligned to permit unimpeded vertical motion therethrough of those keys 28 located within the three central columns 28a of the keyboard 26. Located on each side of the central hole 106 are a plurality of generally circular holes 107, one each of the holes 107 axially aligned with the eight "function" keys 28 positioned within the two outer columns 28b of the keyboard 26. The first disc retaining board 105 also has a pair of elongated openings 108 formed therein and vertically aligned with the elongated openings 84 of the retaining board 80 for allowing movement of the toggle arms of the switches 30 and 32 therethrough.

Each of the eight holes 107 of the retaining board 105 is accurately sized to accept a disc, generally designated at 110. The discs 110 are constructed of thin flexible material, each having an electrically conductive bottom surface and symmetrically shaped about a central longitudinal axis, such that its upper surface is convexly shaped as viewed in FIG. 3.

A first circuit board 112 is positioned directly below and engages the first disc retaining board 105. The first circuit board consists of a printed circuit board having a circuit conductor pattern configured on its bottom surface (not illustrated) and a plurality of accurately positioned holes 113 therethrough. The first circuit board has a central opening 114 of like size and aligned with the central opening 106 of the first disc retaining board 105. In the preferred embodiment, six of the holes 113 in the circuit board 112 are positioned so as to align with each of the plurality of holes 107 of the first disc retaining board 105, when the retaining (105) and circuit (112) boards are in functional engagement with one another, these six holes are aligned in three pairs as illustrated in FIG. 3. A set of three conducting wires 116 (a), (b) and (c) are looped between opposing pairs of the holes 113 as illustrated in FIG. 3 and are operatively connected to the conductor circuit pattern on the lower side of the circuit board 112.

Referring to FIG. 4, it will be noted that the outer wires 116(a) and (c) of each set of wires 116 aligned with a hole 107 of the firsr disc retaining board are positioned near the peripheral edge of the hole 107 for supporting and making electrical contact with the lower conductive surface of that disc 110 positioned within that hole 107. The centrally located wire 116(b) of the three wires 116, is shorter than the externally mounted wires 116(a) and (c) so as to project within the concave surface of the disc 110 (when viewed from below) and so as not to make electrical contact with the lower conducting surface of the disc 110 resting upon the wires 116(a) and (c). Therefore, when the first disc retaining board 105 is positionally aligned and in engagement with the first circuit board 112, each of the holes 107 of the board 105 will retainably hold one of the convex discs 110 in alignment with the wires 116 of the first circuit board 112 such that the disc 110 is supported by and in electrical contact with the external wires 116(a) and (c), but does not contact the centrally located wire 116(b).

A second disc retaining board 120 is positioned immediately below the first circuit board 112. The second disc retaining board 120 is sized slightly larger than the central opening 114 of the first circuit board 112. The second disc retaining board 120 has a plurality of generally circular holes 121 arranged in three columns and axially aligned with the keys 28 positioned within the central three columns (28a) of the keyboard 26. The general construction and function of the second disc retaining board 120 is similar to that previously described with respect to the first disc retaining board 105. Each of the plurality of holes 121 of the board 120 is sized to retainably accept and hold a disc 123. The plurality of discs 123 are identical in size, construction and function as previously described with respect to the plurality of discs 110.

A second circuit board 125 is positioned directly below and engages the second disc retaining board 120. The second circuit board is generally of like construction to the first circuit board 112, previously described, having a conductor interconnecting pattern on its lower surface and a plurality of holes 127 therethrough for receiving a plurality of wires 128. In the preferred embodiment, six of such holes 128 are arranged in three pairs, grouped for alignment with each hole 121 in the second retaining board 120. The three wires 128 connected between the three pairs of holes 127 are of like shape, construction and function as those wires 116 previously discussed with respect to the first circuit board 112.

When the second disc retaining board 120 and the second circuit board 125 are sandwiched in operative engagement with one another, one of the plurality of discs 123 will be aligned so as to conductingly engage the outer two wires 128 (a) and (c) aligned with each of the holes 121 of the retaining member 120, in like manner as was previously described with respect to the wires 116 (a) and (c) and the discs 110.

Each set of three wires 116 and 128 respectively associated with the first (112) and second (125) circuit boards acts as a switching element of the keyboard switching panel 56. Referring to the 116 set of wires, when a disc 110 is functionally resting upon the outer wires 116(a) and (c), the switch is functionally in an open mode. When the convex portion of the flexible disc 110 is depressed downward by force of the stud portion of one of the keys 28, the conductive lower surface of the disc 110 provides an electrical short between the outer wires 116 (a) and (c) and the center wire 116 (b), causing the switch to operate in a closed mode. A similar result is obtained for those switches represented by the set of wires 128 and the discs 123.

Each of the wires 116 and 128 projecting through the first and second circuit boards 112 and 125 respectively is connected to the conducting printed circuit patterns on the bottom sides of the respective circuit board. Those electrical components (only generally illustrated at 130 in FIG. 4) required to implement the calculator circuits 69 (FIG. 2) are mechanically and electrically mounted upon the conductor patterns on the bottom sides of the first and second boards.

In the preferred embodiment, one end of the first circuit board 112 terminates at a multi-pad connector terminal 118. Similarly, one end of the second circuit board 125 terminates at a multi-pad connector terminal 129. Hard-wire connections (not illustrated) between the connector terminals 118 and 129 respectively provide those electrical connections required between the switches of the keyboard switching panel 56, between the keyboard switching panel 56 and the calculator circuits 69 between electrical circuits within the calculator circuits block 69, between the calculator circuits 69 and the digital display 34 and between the circuits of the keyboard switching panel 56 and the telephone circuit block 62 (see FIG. 2).

FIG. 4 illustrates, in cross-section, a detail partial view of the layered assembly of FIG. 3, with each of the layers illustrated in their functional "sandwiched" positiones. The cross-sectional view is taken through one of the centrally located keys (28a) of the keyboard 26.

OPERATION OF THE PREFERRED EMBODIMENT

A user of the telephone/calculator apparatus of my invention may operate the apparatus in any one of three modes. The apparatus may be employed solely to perform the normal functions of a telephone; the apparatus may be employed solely as a calculator; and the apparatus may be employed both as a calculator and telephone, each simultaneously fully operative.

Referring to FIGS. 1 and 2, the calculator function of the apparatus is energized by means of the On/Off switcn 30. When positioned in its Off position, the calculator circuits 69 and the digital display 34 are de-energized. In this operational mode, a user of the apparatus may employ the telephone for its normal purposes. That is, he may place and receive telephone calls in normal fashion. When placing a call, he would use the three central columns of selector keys (28a) on the keyboard 26 for entering the desired telephone number. It will be noted that the signal flow path 60 (FIG. 2) from the keyboard switching panel 56 to the telephone circuits 62 represents an electro-mechanical signal flow path which enables the mechanically activated toggle grid 101 (FIG. 3) to provide activation signals to the "tone" generating circuit, within the telephone circuits 62. When the switch 30 is positioned in its Off position, depression of the selector keys 28 has no operative effect upon the calculator circuits 69 or upon the digital display 34.

The calculating and display capabilities of my apparatus are enabled when the toggle arm 30c of the switch 30 is placed in its On position. When so positioned, the keyboard switching panel 56, the calculator circuits 69 and the digital display 34 are energized either by means of a AC/DC convertor 42 or by means of the DC battery pack 51, as determined by the position of the toggle arm 48c of the switch 48. It will be understood that both (as illustrated in FIG. 2) or either one of the DC battery pack 51 or the AC/DC convertor 42 could be employed without departing from the spirit or intent of this invention. This choice of energizing the calculation portion of the apparatus is dictated by the availability of an AC power source accessible to the telephone 20. It is understood that when the telephone hand-set 23 is positioned as illustrated in FIG. 1, the telephone circuits 62 are operatively de-energized by means of a switch (not illustrated) located in the telephone chassis cradle for the hand-set.

With the calculator circuits 69 and display 34 energized and the telephone circuits 62 disabled, a user of the apparatus may enter, by means of the selector keys 28 of the keyboard 26, numerical (digital) information to the calculator circuits 69 and perform arithmetic and manipulative operations thereon. A user enters the digital information supplied to the calculator circuits 69 by selectively depressing those selector keys located within the central three columns (28a) of the keyboard 26. Referring to FIGS. 3 and 4, each of the centrally located selector keys 28a is normally positioned (as illustrated in FIG. 4) with the flange 87 of the key in engagement with the lower surface of the retaining grid 80 under the bias of a spring 94. The spring 94 extends between the head portion 92a of the stud 92 of the key and the upper peripheral edges of the disc 123 aligned therewith. The spring 94 also causes the lower conductive surface of the disc 123 to firmly engage the outer support wires 127(a) and (c).

When a user (selectively) depresses one of the keys 28a, the key moves in a downward direction against the bias of the spring 94, over the travel distance "x," until the bottom surface of the tube-like extension 90 of the key 28 is placed in resting engagement against the upper surface of the second disc retaining member 120. Simultaneously, the lower tip of the stud 92 will engage the center of the flexible disc 123 aligned therewith, deforming (bending) the convex disc 123 in the downward direction, and causing the conductive lower surface of the disc 123 to electrically contact the center support wire 127(b) of the switching panel 56. The simultaneous engagement of the conductive lower surface of the disc 123 with all threee wires 127 below that disc, electrically closes the switch associated therewith, and sends an electrical signal by means of the signal flow path 67 to the data input terminal 68 of the calculator circuits 69. Upon release of downward pressure by a user upon the upper surface 86 of the key 28, the key will return to its normal position (as urged by the spring 94) illustrated in FIG. 4. The disc 123 will return to its normal convex shape, re-opening the electrical circuit between the outer wires 127 (a) and (c) and the central switch contact 127(b).

In like manner, a user of the apparatus can succesively enter digital information to the calculator circuits 69 by selectively depressing the keys 28 within the central three columns 28a of the keyboard 26. In the preferred embodiment, as the calculator circuits 69 receive the selectively entered digital information by means of the data input terminal 68 from the keyboard switching panel 56, signals may be sent from the calculator circuits 69 to the digital display 34 by means of the signal flow path 74 to sequentially energize the digits 35 of the digital display 34, in the standard calculator fashion (digits are entered on the display from right to left).

A user of the apparatus enters a decimal point, and instructs the calculator circuits 69 to perform specific arithmetic or manipulative operations upon the entered digital information by selectively depressing the "function" keys 28 located in the two outer columns 28b of the keyboard 26. The eight function keys, previously labeled, represent the typical functional operations found on a general purpose calculator. For example, activation of that key designated as "C", provides an instruction to the calculator circuits 69 to clear out the last entered operand; such an instruction will also cause the calculator circuits 69 to provide a "clearing" signal to the digital display 34, de-energizing all the LEDs therein and preparing the calculator circuits 69 for entry of a new operand. The eight function keys are activated by a user in like manner to that previously described with respect to the centrally located (28a) digital information keys. Each function key is normally retained against the retaining grid 80 by means of the spring force of the convex discs 110, and when depressed, deforms the disc 110 associated therewith to close the electrical switch circuit associated with the switch contact wires 116 on the first circuit board.

By selectively activating the keys 28 of the keyboard 26, therefore, a user of the apparatus can enter digital information and provide arithmetic and manipulative operations (normal general purpose calculations) thereon. It will be noted that while the telephone circuits 62 are simultaneously being mechanically toggled by means of the toggle arm grid 101 whenever the centrally located keys 28a are activated, such toggling does not interrupt normal telephone operations when the apparatus is operative in this mode. Further, while the preferred embodiment employs a specific "push-button" mechanical configuration for providing electrical signals to the calculator (69) and the telephone (62) circuits, it will be understood that other input keyboard configurations and activation techniques can be employed without departing from the spirit and intent of my invention.

The "K-CHAIN" switch 32 on the keyboard 26 operates as a constant enable switch for the calculator circuits 69. If a user activates the "K-CHAIN" switch 32 in its active position, after first entering an operand into the calculator circuit 69, he may thereafter perform repetitive manipulative operations (multiplication, division, etc.) with the operand without being requried to re-enter that operand before each manipulative ("function") operation.

The third mode of operation of the preferred embodiment is to simultaneouly operate both the telephone and calculation capacities of my invention. In this mode of operation, the calculator circuits will be energized by means of the switch 30 being positioned in its On position, and the three columns of centrally located keys 28a of the keyboard 26 will be simultaneously operatively shared by the telephone circuits and by the calculator circuits 69. For example, when a user lifts the hand-set of the telephone 20, thus enabling the telephone circuits 62, and enters a "telephone number" by means of the selector keys 28a, he will simultaneously: (1) cause the telephone circuits 62 to generate the appropriate tone codes required by the telephone system for operatively connecting the telephone 20 to the "dialed" number; and (2) will also cause those "numbers" selectively entered by means of the keys 28a to be displayed on the digital display 34 by means of the calculator circuits 69 as previously described. Therefore, after "dialing" a telephone number, should the user of the apparatus do no more, the telephone number he entered will be displayed on the digital display 34 thereafter until subsequently cleared by means of the "C" function key or by de-energization of the calculator circuits by means of the switch 30. Once a phone call has been completed to the "dialed" number, however, the user may therafter enter digital information and perform arithmetic and manipulative operations thereon by means of the keys 28 of the keyboard 26 without disrupting his conversation over that telephone. Should the user at any time during his conversation decide to disable the calculator portion of the apparatus, he need merely switch the On/Off switch 30 to its Off position, without disruption to his telephone conversation.

While I have disclosed a specific embodiment of my invention, it will be understood that this is for the purpose of illustration only, and that my invention is to be limited solely by the scope of the appended claims.

What is claimed is:

1. The combination with a telephone having a desk-mountable telephone chassis defining a generally planar front panel; telephone circuit means in said chassis for performing normal telephone transmission and reception functions; a plurality of push-button telephone input selector keys arranged upon the front panel of the chassis, each normally disposed in a first position and being moveable to a second position upon application thereto of an external mechanical stimuli; telephone input switching means in said chassis cooperatively connected for activation by movement of the telephone input selector keys between their first and second positions for providing input signals to said telephone circuit means; of a calculator operatively sharing with the telephone only the activating movement of its selector keys, comprising:
   a. general purpose calculator circuit means mounted on circuit boards within the chassis for performing arithmetic and manipulative operations on and in response to received digital information;
   b. an electro-mechanical switching grid in said chassis having a plurality of switching members physically and operatively independent of the telephone circuit means and of the telephone input switching means, connected to directly supply said digital information to said calculator circuit means, said switching members being operative in conductive and in non-conductive modes for producing said digital information;
   c. a plurality of push-button calculator actuator keys disposed across the front panel of the telephone chassis and including the plurality of telephone input selector keys, said calculator actuator keys being normally operable in a first position and being moveable to a second position upon receipt of an external mechanical stimuli;
   d. means for mounting said switching grid in cooperative alignment with said calculator keys such that each of such calculator actuator keys moving between its said first and said second positions directly activates at least one of said switching members of said switching grid distinctly separate from activation of the telephone input switching means; and
   e. visual display means mounted on the telephone chassis and operatively connected with said calculator circuit means for providing a visual numerical output display therefor.

2. The combination as recited in claim 1, wherein each of said plurality of push-button calculator actuator keys has an elongate stud projection longitudinally extending within the telephone chassis in the direction of travel of its respective key; and wherein said stud projection of each of said actuator keys is cooperatively aligned to directly engage an associated one of said switching members of said switching grid to operatively toggle said associated switching member between its said conductive and non-conductive modes for producing said digital information in response to movement of said key between its said first and said second positions.

3. The combination as recited in claim 2, wherein said calculator switching grid is sized for mounting in otherwise empty space within the telephone chassis below and slightly spaced apart from the front panel of the telephone chassis and such that said plurality of switching members address the lower surface of the front panel; and wherein each of said switching members comprises a pair of normally open stationary contacts mounted in ordered configuration addressing the lower surface of the front panel, and a flexible moveable contact element, one each of said moveable contact elements being fixedly aligned with and operatively interposed between its associated said pair of stationary contacts and said stud projection of the associated calculator actuator key for switching the conductive states between said pair of said stationary contacts in response to movement of said associated calculator actuator key between its said first and second positions; said stud projection of each of said calculator actuator keys being operative when in its said second position to position said moveable contact element of its associated said switching member to electrically close the circuit between said associated pair of stationary contacts, causing said switching member to become operative in its said conductive state.

4. The calculator combination apparatus as recited in claim 3, wherein said flexible movable contact means includes mounting grid means for aligning and fixedly holding each of said flexible contact elements directly above and in slightly spaced apart alignment with its associated pair of stationary contacts and wherein each of said flexible contact elements comprises a flexible disc member having a conductive surface addressing its associated pair of stationary contacts and being of concave configuration as viewed from said stationary contacts, said mounting grid means normally maintaining said disc members in electrical insulated relationship with their associated pairs of stationary contacts and said disc members being flexibly deformable when engaged by said associated stud projections to engage their respective pairs of stationary contacts, causing electrical connection therebetween.

5. The combination as recited in claim 2, wherein said plurality of calculator actuator keys are further characterized by a first set of such keys comprising the telephone input selector keys, the operative movements between their said first and said second positions of which activate both the telephone input switching means and said calculator switching grid, and a second set of calculator function keys the operative movements of which activate only said calculator switching grid, wherein each of said first set of keys is characterized by:
   a. an upper portion sized to project above the front panel of the telephone chassis;
   b. means for preventing removal of said first set of keys through the front panel of the telephone chassis;
   c. a lower portion continuous with said upper portion and comprising a hollow downwardly extending tube-like member;
   d. a stud projection comprising an enlarged stud head cooperatively received and held in fixed position within said tube-like member, and an elongate stud body projecting a pre-determined distance below said tube-like member; and
   e. a spring coaxially aligned with said elongate stud body normally biasing its associated said actuator key toward its said second position and yieldingly moveable under pressure of an external mechanical stimuli to enable said associated actuator key to move to its said second position.

6. A method of providing a telephone of the type having a push-button input keyboard including a plurality of selector keys and cooperatively operable telephone switching circuits within a desk-mountable telephone chassis, with localized calculating and display capabilities, simultaneously operable with but distinctly separate from normal telephone transmission and reception capabilities of the telephone and sharing only the motion of the selector keys with the telephone, comprising the steps of:
 a. modifying the input keyboard of the telephone chassis to accommodate a plurality of push-button calculator function selector keys;
 b. mounting within the telephone chassis general purpose calculator circuit means capable of providing arithmetic and manipulative operations upon received digital information;
 c. mounting an electo-mechanical contact grid physically and operatively independent from the telephone switching circuits within the telephone chassis in cooperative alignment underlying the plurality of calculator function selector keys for direct activation thereby, said contact grid having a plurality of electrical contact elements aligned for cooperative activation by said calculator function selector keys;
 d. connecting said general purpose calculator circuits with said calculator contact grid for direct activation and control by the electrical conduction states of said plurality of electrical contact elements;
 e. modifying the plurality of telephone selector keys for directly activating, independent of activation of the telephone switching circuits, said contact elements of said calculator contact grid; and
 f. providing said calculating circuits with a visual display panel mounted to the telephone chassis.

* * * * *